(12) United States Patent
Yoon et al.

(10) Patent No.: US 6,560,304 B1
(45) Date of Patent: May 6, 2003

(54) APPARATUS FOR REDUCING PATTERN JITTER BY USING LOCALLY SYMMETRY FORCING WAVE GENERATING UNIT AND METHOD USING THE SAME

(75) Inventors: Young Bin Yoon, Kyungki-Do (KR); In Seok Hwang, Choongcheongnam-Do (KR); Yong Hoon Lee, Daejon (KR)

(73) Assignee: Hyundai Electronics Industries Co., Ltd., Inchon-shi (KR)

( * ) Notice: Subject to any disclaimer, the term of this patent is extended or adjusted under 35 U.S.C. 154(b) by 0 days.

(21) Appl. No.: 09/307,794

(22) Filed: May 10, 1999

(30) Foreign Application Priority Data

May 15, 1998 (KR) ............................................. 98-17530

(51) Int. Cl.[7] ................................................ H04L 7/00
(52) U.S. Cl. ........................................ 375/371; 375/346
(58) Field of Search ................................. 375/346, 350, 375/348, 349, 292, 355, 362, 363, 371

(56) References Cited

U.S. PATENT DOCUMENTS

| | | | | |
|---|---|---|---|---|
| 4,231,071 A | * | 10/1980 | Anderson | 360/40 |
| 5,297,172 A | * | 3/1994 | Shenoy et al. | 375/371 |
| 5,325,093 A | * | 6/1994 | Takamori | 341/155 |

OTHER PUBLICATIONS

Sklar, Bernard, Digital Communications: Fundamentals and Applications, 1988, Prentice Hall, pp. 100–102.*
Aldo N. D'Andrea et al. "Nearly Optimum Prefiltering in Clock Recovery" IEEE Transactions on Communications, vol. COM–34, No. 11, Nov. 1986, pp. 1081–1088.

* cited by examiner

Primary Examiner—Stephen Chin
Assistant Examiner—David B. Lugo
(74) Attorney, Agent, or Firm—Fleshner & Kim, LLP

(57) ABSTRACT

An apparatus and method for reducing a pattern jitter is provided that uses a local symmetry forcing wave signal. Pattern jitter is generated when a timing phase of a symbol signal is recovered. The apparatus can include a demultiplexer receiving a preamble and data signal. A nonlinear operation unit preferably only receives the preamble signal from the demultiplexer, and a locally symmetric wave generator preferably only receives the data signal from the demultiplexer. A buffer memory selects from an output signal of the nonlinear operation unit and an output signal of the locally symmetric wave generator. An input signal controller receives a control signal and outputs an input control signal to control the buffer memory and the demultiplexer. The apparatus and method that reduces pattern jitter is a system with reduced complexity and reduced cost to advantageously embody a very large scale integration VLSI or the like.

19 Claims, 11 Drawing Sheets

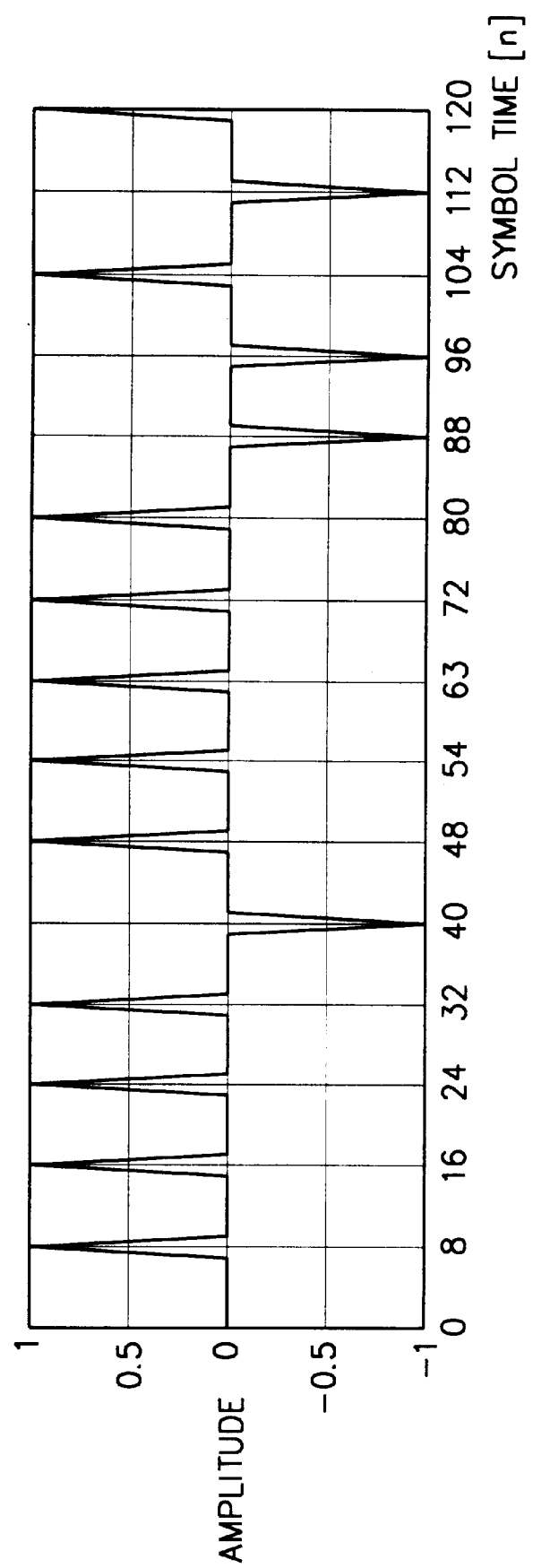

APPARATUS FOR REDUCING PATTERN JITTER BY USING LOCALLY SYMMETRY FORCING WAVE GENERATING UNIT AND METHOD USING THE SAME

BACKGROUND OF THE INVENTION

1. Field of the Invention

The present invention is directed to signal transmission and reception, and in particular, to an apparatus that reduces pattern jitter and a method using the same.

2. Background of the Related Art

In general, when a signal is transmitted and received between a transmitting terminal and a receiving terminal in data communications, the signal transmitted from the transmitting terminal is received by the receiving terminal, and then, a timing phase of the received signal must be recovered. Recovering the timing phase implies finding an exact sampling timing from the received signal to regenerate the exact transmitted signal.

For example, in accordance with a nonlinear spectral line timing recovery, which is popularly used in an analog field, a carrier is removed from a received signal (in an analog type), and a tone signal is generated by squaring the received signal with its carrier removed. A timing phase signal of the received signal is generated by filtering the tone signal, and thus, the transmitted signal is regenerated.

For example, in accordance with a discrete-time nonlinear spectral line timing recovery, which is utilized in a digital field, an oversampling is carried out on a received symbol signal. A timing phase signal of the received signal is generated by carrying out a filtering or a digital fourier transform DFT on the oversampled signal, and thus, the transmitted signal is regenerated.

When the timing phase of the received signal is recovered by the above-described methods, even if a channel noise is small, a timing error occurs that makes it difficult to find an exact sampling timing of the received signal. In particular, when the transmitted signal from the transmitting terminal has a pattern of "... 1, 1, 1, ..." or "... −1, −1, −1, ...", even if a nonlinear operation unit for squaring the received signal of the receiving terminal serves to generate a nonlinear signal, a tone signal of the nonlinear signal is small, and thus, noise is inserted into the timing phase signal. The error is called a "pattern jitter" or a "self-noise".

A related art apparatus for reducing the pattern jitter will now be described. FIG. 1 is a schematic view of the related art apparatus for reducing the pattern jitter. The apparatus includes an A/D (analog/digital) converter 10 receiving a symbol signal DIN and sampling the N symbol signals with a sampling frequency f. The A/D (analog/digital) converter 10 outputs a received signal D1, which is convoluted with a raised cosine wave. A prefilter 12 filters the received signal D1 and outputs a first filtering signal D2. A nonlinear operation unit 14 squares the filtering signal D2 to output a nonlinear signal D3, and a bandpass filter 16 bandpass-filters the nonlinear signal D3 to output a second filtering signal D4. A phase detector 18 detects a phase of the second filtering signal D4, and outputs a timing phase signal DOUT.

A method for reducing the pattern jitter using the related art apparatus for reducing the pattern jitter will now be described. FIG. 2 illustrates a raised cosine wave signal inputted to the prefilter and a quasi locally symmetric wave signal QLS outputted from the prefilter to show a principle for reducing the pattern jitter with the related art apparatus.

When the raised cosine wave signal RC is inputted to the prefilter 12, the signal outputted from the prefilter 12 is the quasi locally symmetric wave signal QLS, which is symmetric to a peak or a zero-crossing of the raised cosine wave signal RC and has many tone signals.

FIGS. 3A to 3C respectively illustrate signals inputted to or outputted from the related art apparatus for reducing the pattern jitter. When the symbol signal DIN is a binary type shown in FIG. 3A that is oversampled 8 times higher than the rate of the symbol signal and convoluted with the raised cosine wave signal RC by the A/D converter 10, the received signal D1 is outputted from the A/D converter 10 as shown in FIG. 3B. At this time, the symbol signal and the received signal D1 have pattern jitter because signals that identically have a positive sign and an amplitude value of '1' are repeated for a symbol time 8 to 32 and a symbol time 48 to 80 as shown in FIG. 3A. Therefore, in accordance with the above-described functions of the prefilter 12, the nonlinear operation unit 14 receives the first filtering signal D2 in the quasi locally symmetric wave signal QLS type, which has a property of limiting a band and is locally symmetric to each point indicating integer times of a symbol period as shown in FIG. 3C. Here, the first filtering signal D2 has a value of '0' (zero) on the point indicating the integer times (excluding '0' (zero)) of the symbol period. Accordingly, an interference between the symbol signals is removed. However, the interference still remains on the other points.

The nonlinear operation unit 14 outputs the nonlinear signal D3 only having a positive value by squaring the first filtering signal D2. The bandpass filter 16, which has a center frequency identical to a frequency of the symbol rate, receives the nonlinear signal D3 and outputs the second filtering signal D4 in a sinusoidal wave type.

The phase detector 18, which receives the second filtering signal D4, serves to output the timing phase signal to be regarded as an optimal sampling timing of the symbol signal. The optimal sampling timing is a timing corresponding to a peak or a zero-crossing of the second filtering signal D4. In accordance with the related art method for recovering the timing phase by utilizing the prefilter, the pattern jitter can be reduced by generating a signal in the quasi locally symmetric wave signal QLS type to provide sampling timing information regardless of a pattern of the symbol signal.

However, the related art apparatus and method have various disadvantages. The prefilter of the related art requires a large amount and complex hardware. That is, the prefilter including M taps needs as many multipliers as the number of the taps (M), M−1 adders and M−1 memory devices, which make the related art system bigger. This disadvantage is especially severe when a very large scale integration VLSI is embodied because the multiplier consumes a large amount of electricity as well as takes a large portion of a chip. In addition, the related art method for recovering the timing phase has another disadvantage in that the number of the operations carried out on the symbol signal increases in proportion to the number of the taps in the prefilter.

The above references are incorporated by reference herein where appropriate for appropriate teachings of additional or alternative details, features and/or technical background.

SUMMARY OF THE INVENTION

An object of the present invention is to provide an apparatus and method for reducing pattern jitter that substantially obviates one or more disadvantages caused by limitations of the related art.

Another object of the present invention is to provide an apparatus for reducing a pattern jitter of a symbol signal and a method using the same that determines a timing phase of the symbol signal.

Another object of the present invention is to provide an apparatus for reducing a pattern jitter that requires reduced hardware or consumes a less power.

Another object of the present invention is to provide an apparatus and method that can reduce a specific pattern jitter of a symbol signal by using a local symmetry forcing wave generating unit when a timing phase of the symbol signal is recovered.

In order to achieve at least the above-described objects in a whole or in parts, there is provided an apparatus for reducing a pattern jitter according to the present invention that includes a demultiplexer that receives an input including a preamble signal and a data signal from an analog/digital (A/D) converter; a nonlinear operation unit that receives the preamble signal; a locally symmetric wave generating unit that receives the data signal; a buffer memory that receives an output signal from the nonlinear operation unit and an output signal from the locally symmetric wave generating unit; and an input signal controller that receives a control signal outputted from the A/D converter and outputs an input control signal to control the buffer memory and the demultiplexer.

To further achieve the above objects in a whole or in parts, there is provided an apparatus for reducing pattern jitter according to the present invention that includes a local symmetry forcing wave generator that receives the received signal, a control signal and a previous timing phase signal, and outputs a local symmetry forcing wave signal including more tone signals than the received signal, a bandpass filter that filters the locally symmetry forcing wave signal and outputs a filtering signal, and a phase detector that detects a phase from the filtering signal and outputs a timing phase signal.

To further achieve the above objects in a whole or in parts, there is provided a method for reducing pattern jitter according to the present invention that includes a preamble signal and a data signal, including initializing a timing phase signal using the preamble signal included in the received signal, discriminating between the preamble signal and the data signal included in the received signal using a control signal, performing a nonlinear operation on the preamble signal when an inputted signal is discriminated as the preamble signal, inputting the data signal when the inputted signal is discriminated as the data signal, comparing a sign of the data signal with that of a previous timing signal, inserting a prescribed value between the data signal and a previous data signal when the data signal and the previous timing signal have an identical sign, performing a nonlinear operation on the data signal when the sign of the data signal is different from that of the previous timing signal, bandpass-filtering on a nonlinear operation signal generated by the performing steps, and detecting a phase of the bandpass-filtered signal and outputting a sampling timing phase signal of a symbol signal, wherein the received signal is based on the symbol signal.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIGS. 3A to 3C are diagrams that respectively illustrate a symbol signal, a locally symmetric wave signal and a quasi locally symmetric wave signal of the apparatus of FIG. 1;

DETAILED DESCRIPTION OF PREFERRED EMBODIMENTS

Figure 1:
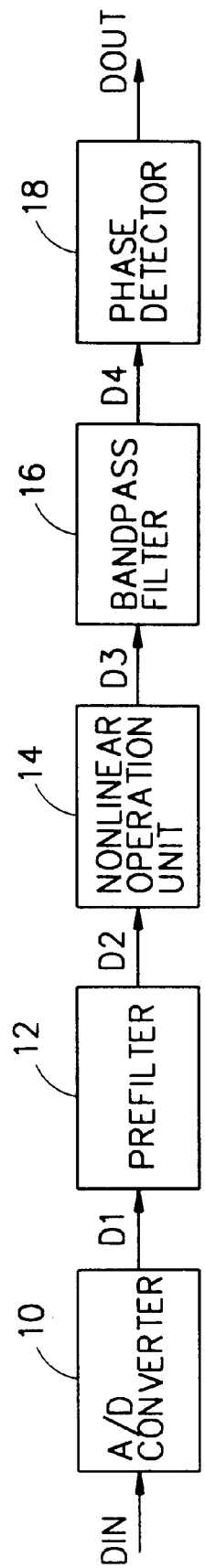
FIG. 1 is a diagram illustrating a schematic view of a related art apparatus for reducing a pattern jitter.
Figure 2:
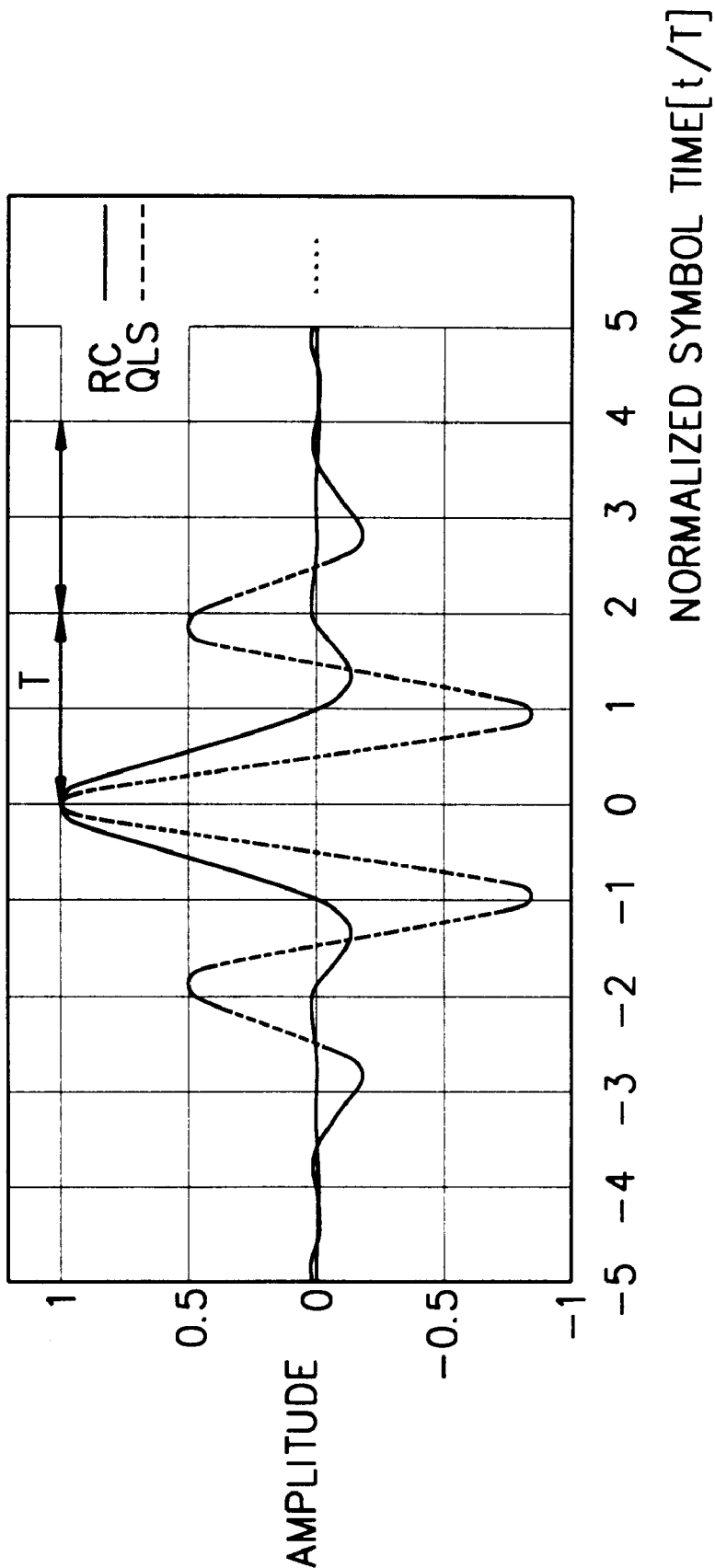
FIG. 2 is a diagram that illustrates a raised cosine wave signal input to a prefilter and a quasi locally symmetric wave signal output by the prefilter in apparatus of FIG. 1.
Figure 3B:
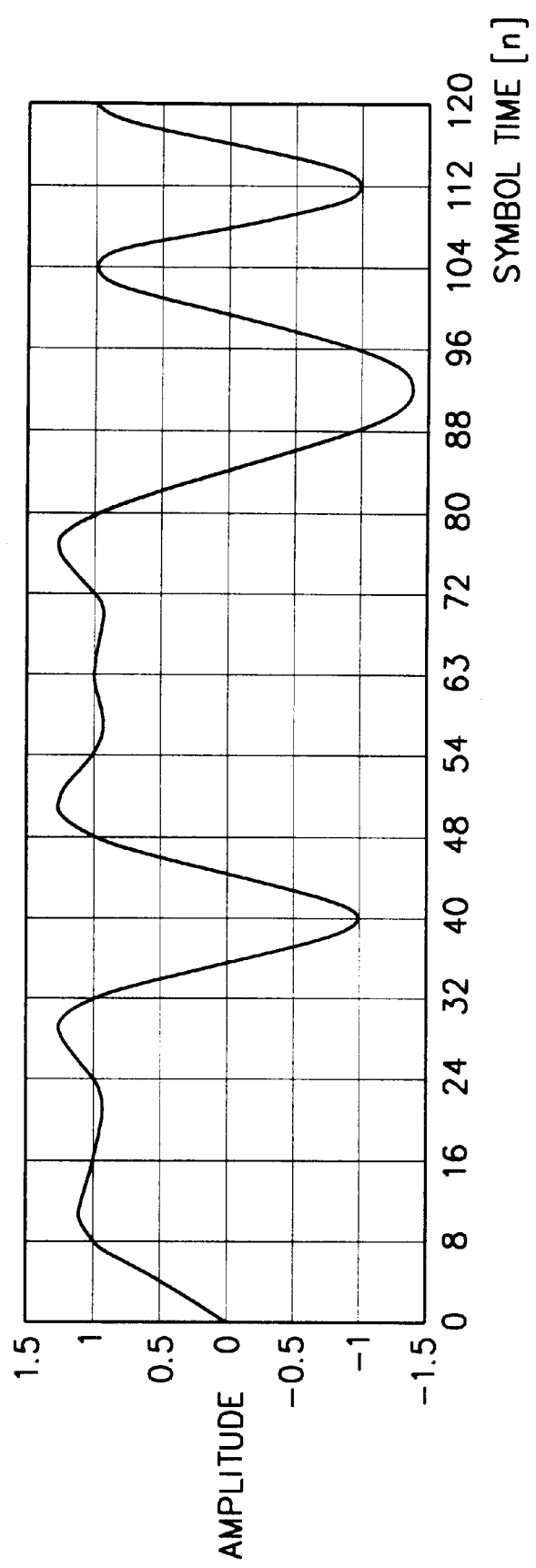
Figure 3C:
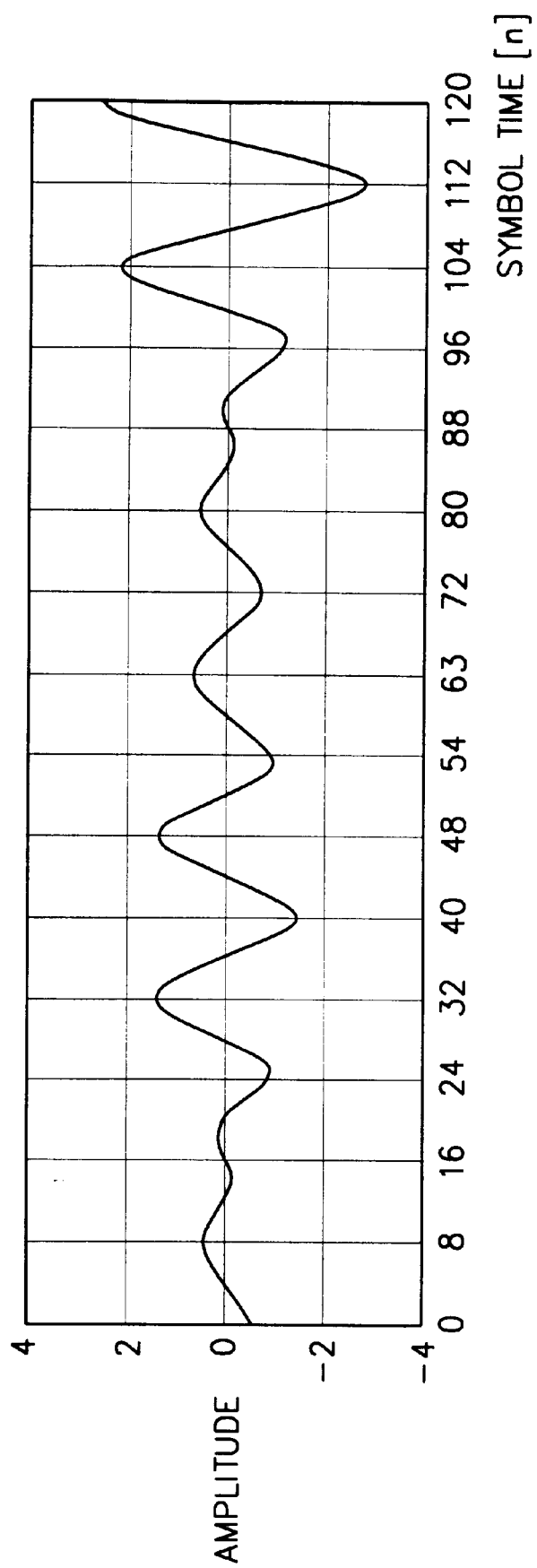
Figure 4:
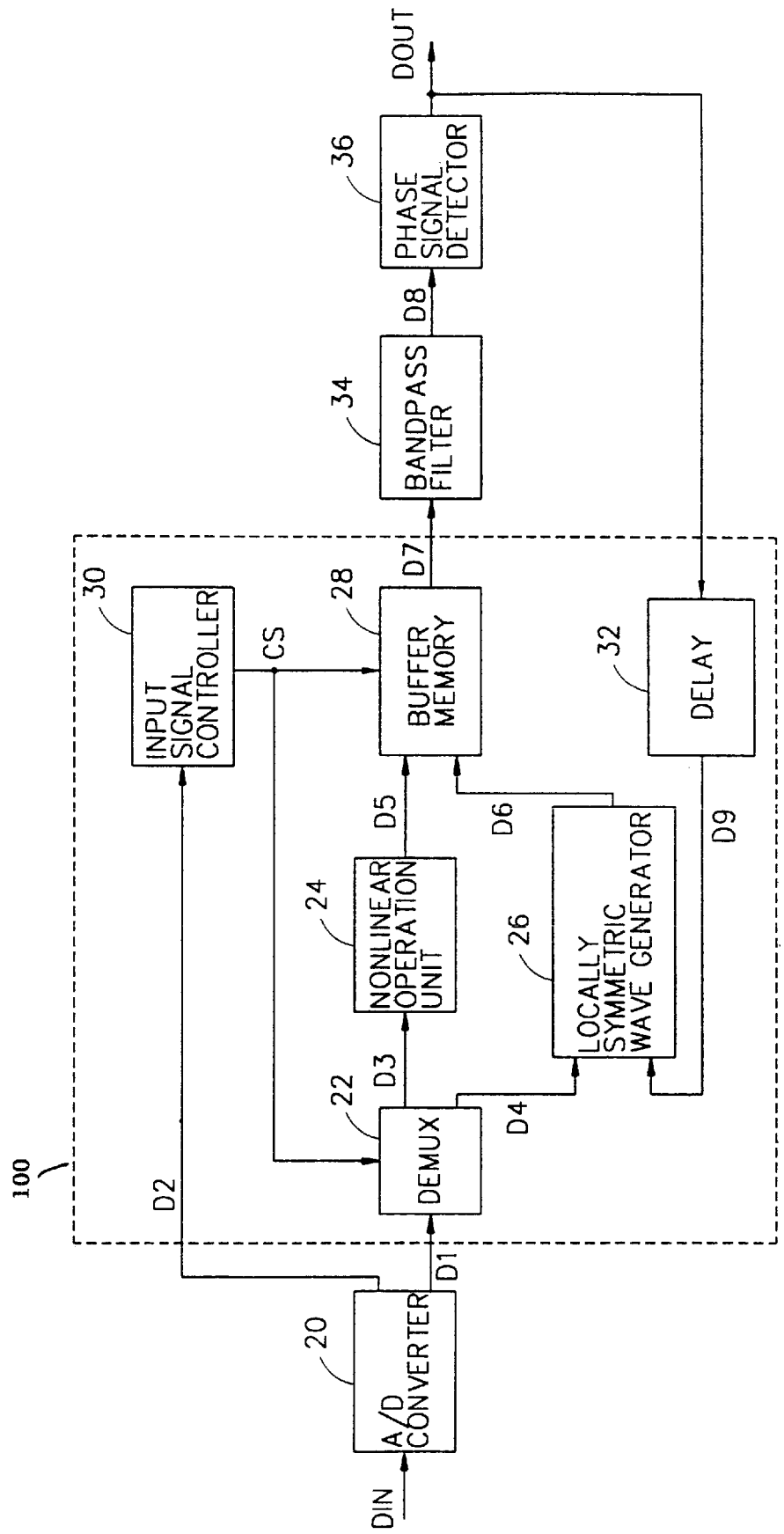
FIG. 4 is a diagram illustrating a schematic view of an apparatus for reducing a pattern jitter in accordance with a preferred embodiment of the present invention.

FIG. 4 is a diagram showing an apparatus that reduces pattern jitter in accordance with a first preferred embodiment of the present invention. The apparatus includes an A/D (analog/digital) converter 20 receiving a symbol signal DIN and outputting a control signal D2 and a received signal D1, which is oversampled with a sampling frequency f. The apparatus further includes local symmetry forcing wave generating unit 100 that receives the received signal D2, the control signal D1 and a previous timing phase signal DOUT and outputs a local symmetry forcing wave signal D7. A bandpass filter 34 receives the local symmetry forcing wave signal D7 and outputs a filtering signal D8, and a phase detector 36 receives the filtering signal D8 and outputs a timing phase signal DOUT.

The local symmetry forcing wave generating unit 100 according to the preferred embodiment includes a demultiplexer 22 receiving the received signal D1 that is outputted from the A/D converter 20, a nonlinear operation unit 24, a locally symmetric wave generator 26, a buffer memory unit 28, an input signal controller 30 and a delay 32. The received signal D1 preferably includes a preamble signal, which is preferably in a pattern of "... 1, −1, 1, −1, ... " or the like. The nonlinear operation unit receives only the preamble signal, carries out a nonlinear operation on the preamble signal, and outputs a nonlinear signal D5. The locally symmetric wave generator 26 receives the previous timing phase signal DOUT and the received signal D1 excluding the preamble signal, and outputs a locally symmetric wave signal D6. The buffer memory 28 receives the nonlinear signal D5 and the locally symmetric wave signal D6, and outputs the local symmetry forcing wave signal D7. The input signal controller 30 receives the control signal D2, which is outputted from the A/D converter, and outputs an input control signal CS to control the demultiplexer 22 and the buffer memory 28.

Figure 5A:
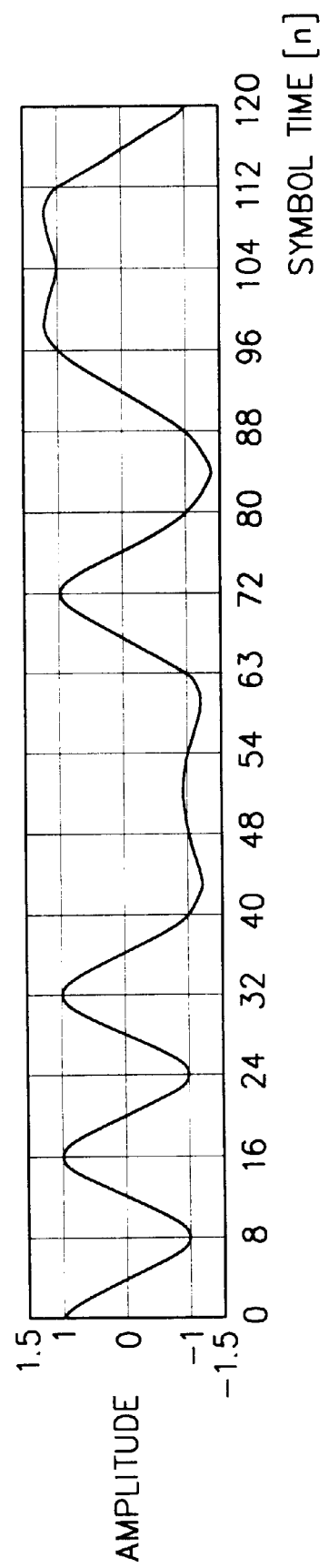
FIGS. 5A to 5D are diagrams that respectively illustrate exemplary signals for a received signal including a preamble signal, a nonlinear output signal, a locally symmetric wave signal, and a local symmetry forcing wave signal of the apparatus of FIG. 4.

Operations of the first preferred embodiment of an apparatus that reduces pattern jitter in accordance with the present invention will now be described. FIG. 5A is a diagram of waveform that depicts the received signal D1 including the preamble signal. The received signal D1 is preferably generated by the A/D converter oversampling the symbol signal DIN 8 times higher than the rate of the symbol signal DIN, and convoluting the symbol signal DIN with the raised cosine wave signal RC. The symbol time between 0 and 40 in the received signal D1 indicates the preamble signal D3, and the symbol time after 40 indicates the data signal D4.

In a data signal D4, which preferably includes the received signal D1 without the preamble signal, the symbol time between 40 and 63 and the symbol time between 80 and 88 have an amplitude of "−1", and the symbol time between 96 and 112 has an amplitude of "1". Therefore, the received signal D1 has pattern jitter.

In accordance with the first preferred embodiment of the apparatus for reducing the pattern jitter according to the present invention, the timing phase signal DOUT of the apparatus for reducing the pattern jitter is initialized by using the preamble signal D3, and the data signal D4 is processed by the locally symmetric wave generator 26 to reduce the pattern jitter.

Figure 5B:
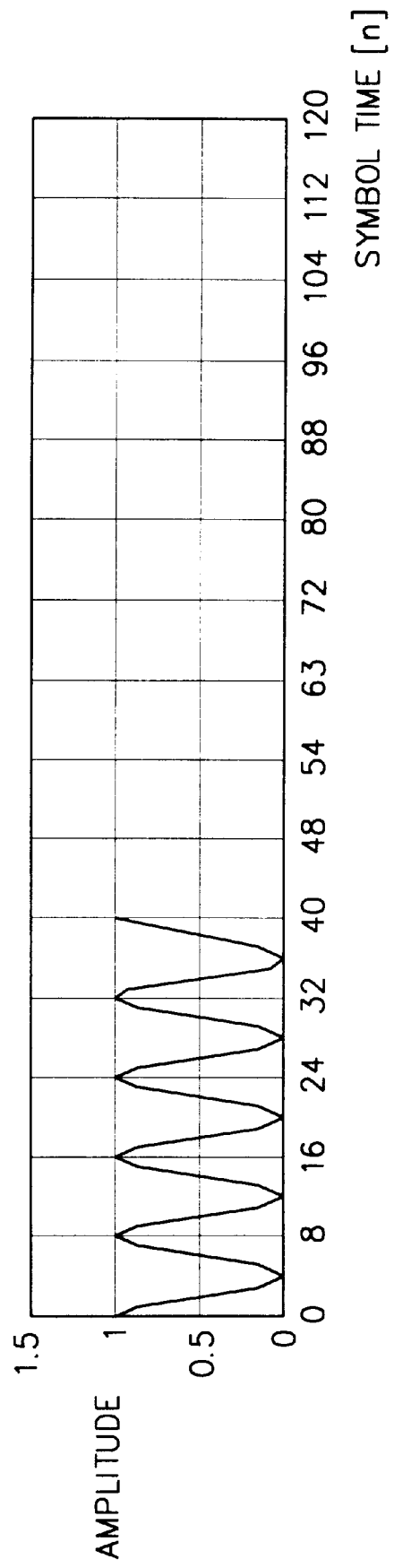

Detailed operations of the apparatus for reducing the pattern jitter in accordance with the first preferred embodiment will now be described. The input signal controller 30 controls the demultiplexer 22 to input only the preamble signal (e.g., between time 0 and 40) to the nonlinear operation unit 24. The nonlinear operation unit 24 functions to preferably square the preamble signal D3 to output the nonlinear signal D5 to the buffer memory 28 as shown in FIG. 5B. Then, the bandpass filter 34, which receives the local symmetry forcing wave signal D7 outputted from the buffer memory 28, outputs the filtering signal D8 to the phase detector 36. The phase detector 36 outputs the timing phase signal DOUT. Therefore, while the preamble signal D3 is inputted, the apparatus for reducing the pattern jitter can initialize the timing phase signal DOUT.

When the timing phase signal DOUT is initialized, the delay unit 32 that receives the timing phase signal DOUT operates to output a delayed timing phase signal D9 to the locally symmetric wave generator 26. The locally symmetric wave generator 26 receives the delayed (i.e., preferably previous) timing phase signal D9 and receives the data signal D4 at the same time to compare the amplitude value of the previous timing phase signal D9 with that of the data signal D4.

Figure 5C:
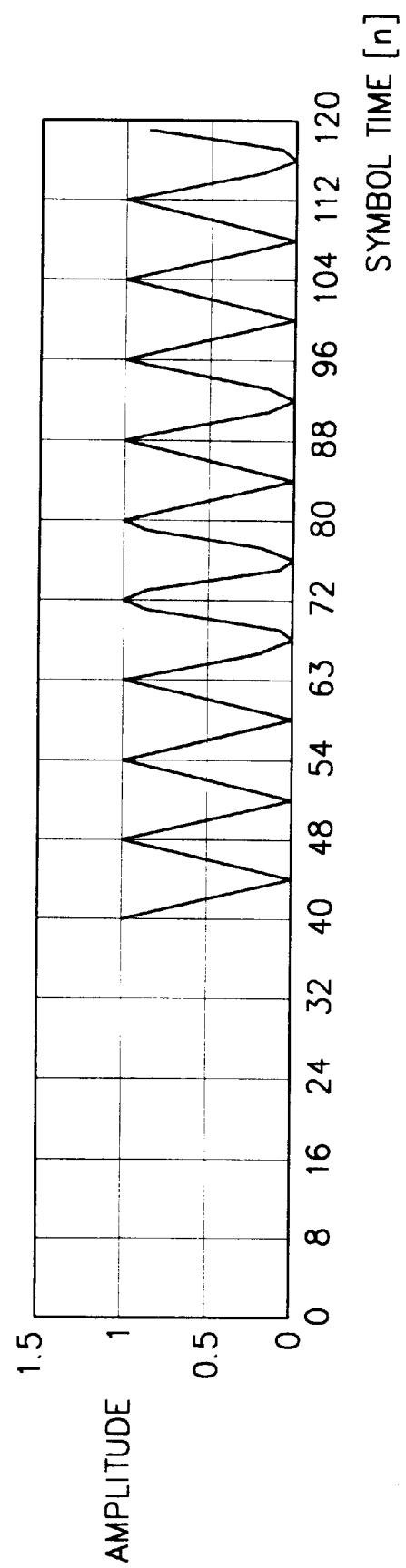

When the amplitude values are identical, the locally symmetric wave generator 26 inserts '0' (zero) therebetween, and thus outputs the locally symmetric wave signal D6, which preferably has increased or many tone signals. Then, the locally symmetric wave generator 26 receives the data signal D4 (e.g., 40, 48, . . . ), and compares the value obtained by squaring the data signal D4 with the value of the previous timing signal D9 outputted from the delay unit 32. In the case that the values are identically '1', the locally symmetric wave generator 26 inserts '0' between the previous value and the current value (e.g., symbol time 40 to 63, 80 to 88, and 96 to 112), and preferably straightly connects the previous value '1', the current value '1' and '0' placed between, respectively. Otherwise, the locally symmetric wave generator 26 outputs the current value, and generates the locally symmetric wave signal D6, as illustrated in FIG. 5C.

Figure 5D:
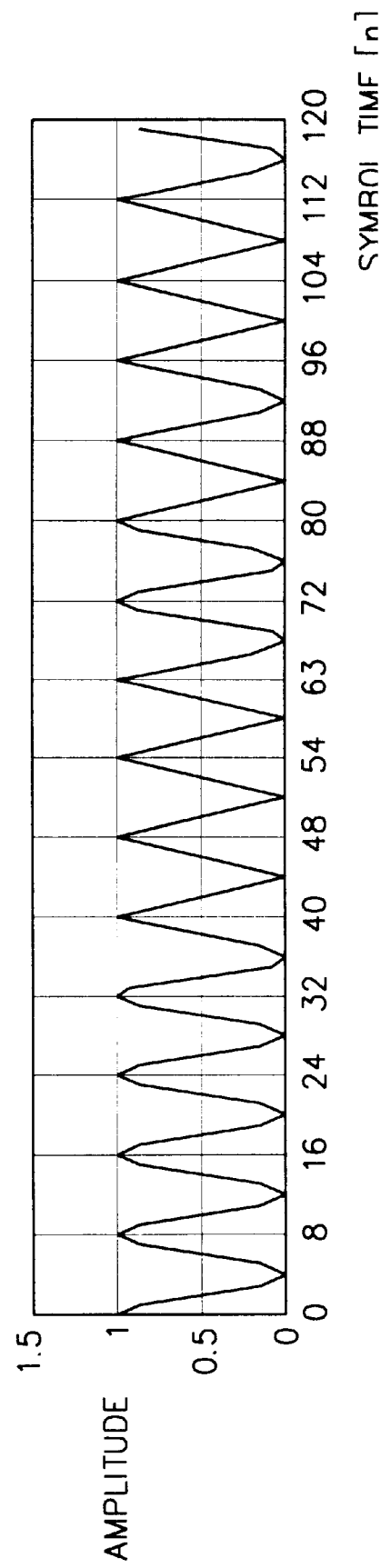

At this time, the waveform shown in FIG. 5D is outputted from the buffer memory 28 because respective signals are selected from the nonlinear signal D5 from the nonlinear operation unit 24 that receives the preamble signal D3, and the locally symmetric wave signal D6 from the locally symmetric wave generator 26, which receives the data signal D4. The buffer memory 28 preferably selects based on the input control signal CS of the input signal controller 30.

Accordingly, the local symmetry forcing wave signal D7 generated by the first preferred embodiment of an apparatus for reducing the pattern jitter serves to reduce the pattern jitter by receiving the symbol signal, which does not have sampling timing information, and generating many tone signals. The timing phase signal DOUT indicating a sampling timing of the symbol signal is generated by the bandpass filter 34 receiving the local symmetry forcing wave signal D7 and having a center frequency identical to a sampling frequency of the symbol signal, and the phase signal detector 36.

Figure 6:
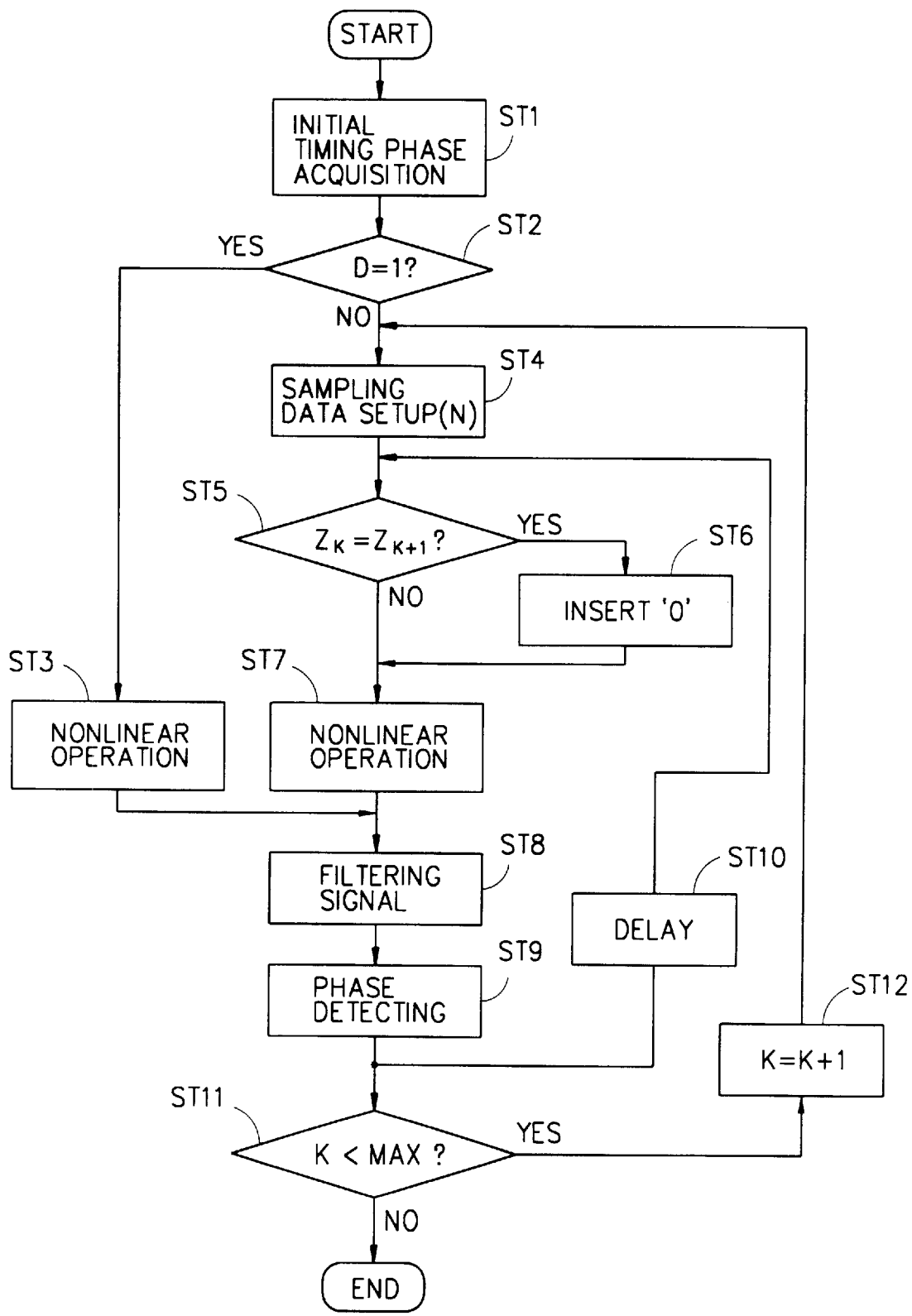
FIG. 6 is a flowchart illustrating another preferred embodiment of a method for reducing the pattern jitter of the symbol signal in accordance with the present invention.

A second preferred embodiment of a method for reducing pattern jitter in accordance with the present invention will now be described with reference to a flowchart shown in FIG. 6. The second preferred embodiment of a method for reducing the pattern jitter continues from a beginning START to a step ST1 where the received signal having the preamble signal preferably in a pattern of '. . . 1, −1, 1, −1, . . . ' and the data signal are inputted, and the sampling timing phase signal is initialized by the preamble signal. From step ST1, control continues to a step ST2 where the preamble signal and the data signal are discriminated in the received signal. If the determination in step ST2 is receipt of the preamble signal, control continues to a step ST3 where a nonlinear operation preferably squares the preamble signal and control continues to a step ST8. When the received signal is the data signal in step ST2, control jumps to a step ST4 where the sampling data signal (for example, 'N') is received. From step ST4, control continues to a step ST5 where the sampling data signal and the previous timing phase signal D9 are received, and the sign of the sampling data signal is compared with that of the previous timing phase signal. When the sampling data signal and the previous timing phase signal have an identical sign in step ST5, control continues to a step ST6 where '0' (zero) (e.g., a prescribed value) is inserted between the sampling data signal. When the sampling data signal and the previous timing phase signal do not have the identical sign in step ST5, control jumps to the step ST7 where a nonlinear operation performed on the sampling data signal. Here, a signal generated by the step ST7 is the locally symmetric wave signal. From steps ST3 and ST7, control continues to step ST8. In the step ST8, the signals generated in step ST3 and step ST7 are inputted to the buffer memory 28, and preferably the local symmetry forcing wave signal D7 is outputted. In the step ST8, the local symmetry forcing wave signal is preferably filtered. From step ST8, control continues to step ST9 where the sampling timing phase signal of the symbol signal is generated from the filtered signal. From step ST9, control continues to a steps ST11 and ST10. In step ST10, the previous timing phase signal is generated by delaying the timing phase signal. From step ST10, control returns to step ST5. In step ST11, a window period K of the sampling data signal, which is compared in step ST5, is compared with a maximum window period MAX of the previously-set sampling data signal. When the window period K of the sampling signal is smaller than the maximum window period MAX of the previously-set sampling data signal, control continues from step ST11 to a step ST12 where a window period of the sampling data signal is increased to compare a sampling data signal of a next succeeding window period K+1. From step ST12, control returns to step ST4. When the window period K of the sampling signal is not smaller than the maximum window period MAX, the process ends.

As described above, the preferred embodiments of an apparatus and method for reducing pattern jitter according to the present invention have various advantages. The apparatus and method for reducing the pattern jitter according to preferred embodiments can reduce the size of required hardware as well as reduce the pattern jitter efficiently by using a local symmetry forcing wave unit. In particular, the multipliers composing the local symmetry forcing wave unit according to the preferred embodiment require N+1 memory devices, which are more than the oversampling data (N) by 1, however, adders are not used, which results in a cost reduction. In addition, in accordance with the preferred embodiment of the apparatus and method for reducing the pattern jitter, the number of the operations to process the symbol signal is reduced. That is, the multiplication is carried out on one symbol signal 2N times, and the addition is not carried out thereon.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A wave generator for a receiver comprising:
    a demultiplexer that receives a signal having a preamble and a data signal, and outputs the preamble signal and the data signal;
    a local symmetric wave generator that receives the data signal from the demultiplexer and a delayed timing phase signal and inserts a prescribed value between a current data signal and a delayed data signal when the previous timing phase signal and the current data signal have an identical sign, and outputs a locally symmetric wave signal generated by connecting the prescribed value and the previous and current data signals;
    a nonlinear operation unit that receives the preamble signal from the demultiplexer and performs a nonlinear operation to output a nonlinear signal; and
    a buffer memory that receives the locally symmetric wave signal and the nonlinear signal to output a local symmetry forcing wave signal.

2. The wave generator of claim 1, further comprising:
    a bandpass filter that filters the local symmetry forcing wave signal and outputs a filtering signal; and
    a phase detector that detects a phase from the filtering signal and outputs the timing phase signal, which is fed back to the local symmetry forcing wave generator as the second control signal.

3. The wave generator of claim 1, further comprising:
    an analog/digital converter, wherein the analog/digital converter samples an input signal and convolutes the sampled input signal with a raised cosine signal to output the signal; and
    an input signal controller that receives an input control signal from the analog/digital converter and controls the demultiplexer and the buffer memory.

4. A method for reducing a pattern jitter of a received signal that includes a preamble signal and a data signal, comprising:
    initializing a timing phase signal using the preamble signal;
    processing the data signal to output a processed data signal when the received signal is discriminated as the data signal, wherein the processing step comprises,
        comparing a sign of the data signal with that of a previous timing signal,
        inserting a prescribed value between the data signal and a previous data signal when the data signal and the previous data signal have an identical sign, and
        performing a nonlinear operation on the data signal when the sign of the data signal is different from that of the previous data signal; and
    generating the timing phase signal of a symbol signal based on the processed data signal, wherein the received signal is based on the symbol signal, and wherein the previous data signal is determined at the time of a previous timing signal.

5. The method of claim 4, further comprising:
    discriminating between the preamble signal and the data signal included in the received signal using a control signal; and
    performing a nonlinear operation on the preamble signal to output a nonlinear operation signal when the received signal is discriminated as the preamble signal, and wherein the generating step comprises,
        bandpass-filtering on the nonlinear operation signal and the processed data signal, and
        detecting a phase of the bandpass-filtered signal and outputting the timing phase signals.

6. The method of claim 5, further comprising:
    receiving an input signal;
    sampling the input signal using an A/D converter, wherein the A/D converter outputs the control signal; and
    convoluting the sampled signal with a raised cosine was to output the received signal.

7. The method of claim 4, wherein the prescribed value signal is zero "0".

8. The method of claim 4, further comprising:
    delaying the timing phase signals to generate the previous timing signal;
    comparing a window period of the data signal with a prescribed maximum window period; and
    increasing a window period to compare the data signal in a next succeeding window period when the window period of the data signal is smaller than the prescribed maximum window period.

9. An apparatus comprising:
    a demultiplexer configured to output a preamble signal and a data signal from a first signal; and
    a signal processing circuit configured to process the data signal into a timing signal, wherein the signal processing circuit includes a locally symmetric wave generator that receives the data signal from the demultiplexer and a delayed timing phase signal and inserts a prescribed value between a current data signal and a delayed data signal when the previous timing phase signal and the current data signal have an identical sign, and outputs a locally symmetric wave signal generated by connecting the prescribed value and the previous and current data signals.

10. The apparatus of claim 9, further comprising an analog/digital converter configured to output the first signal from a second signal.

11. The apparatus of claim 10, wherein:
    the first signal is a digital signal; and
    the second signal is an analog signal.

12. The apparatus of claim 10, wherein the signal processing circuit comprises:

a non-linear operation unit.

13. The apparatus of claim 12, wherein:

the demultiplexer is configured to output a preamble signal portion to the nonlinear operation unit;

the demultiplexer is configured to output a data signal portion to the locally symmetric wave generator.

14. The apparatus of claim 13, wherein:

the nonlinear operation unit is configured to output a nonlinear signal; and the nonlinear signal is the preamble signal squared.

15. The apparatus of claim 14, wherein the signal processing circuit further comprises:

a bandpass filter;

a phase signal detector; and a delay circuit.

16. The apparatus of claim 15, wherein:

the bandpass filter is configured to output a first filtered signal;

the first filtered signal is the preamble signal after being squared and filtered;

the phase signal detector is configured to output a first timing phase signal;

the first timing signal is the timing phase of the preamble signal after being squared and filtered;

the delay circuit is configured to output the first timing phase signal to the locally symmetric wave generator at the same time as the data signal is output from the multiplexer to the locally symmetric wave generator;

the locally symmetric wave generator is configured to output a locally symmetric wave signal;

the locally symmetric wave signal is a product of a comparison between the first timing phase signal and the data signal;

the bandpass filter is configured to output a second filtered signal;

the second filtered signal is the locally symmetric wave signal after being filtered;

the phase signal detector is configured to output a second timing signal; and the second timing signal is the timing phase of the locally symmetric wave signal after being filtered.

17. The apparatus of claim 16, wherein the comparison between the first timing phase signal and the data signal comprises the following steps:

squaring the data signal;

determining instances when the data signal and the timing phase signal are both maximum; and multiplying the squared data signal by the first timing signal at the determined instance when the data signal and the time phase signal are both maximum;

outputting the product of the multiplication of the squared data and the first timing signal as the locally symmetric wave signal.

18. The apparatus of claim 17, further comprising a buffer memory and an input signal controller, wherein:

the analog/digital converter is configured to output a first control signal from the second signal; and the input signal controller is configured to output an second control signal to the demultiplexer and the buffer memory.

the second control signal controls flow of data in the signal processing circuit for the comparison between the first timing phase signal and the data signal.

19. The apparatus of claim 18, wherein the second control signal controls flow of data in the signal processing circuit for the comparison between the first timing phase signal and the data signal.

* * * * *